(12) United States Patent
Belcourt et al.

(10) Patent No.: US 8,001,663 B2
(45) Date of Patent: Aug. 23, 2011

(54) SAFETY CARABINER

(75) Inventors: William R Belcourt, Salt Lake City, UT (US); Ben Walker, Draper, UT (US); David Mellon, Park City, UT (US); Jeremy Saxton, Draper, UT (US); Brendan Perkins, Salt Lake City, UT (US)

(73) Assignee: Black Diamond Equipment, Ltd., Salt Lake City, UT (US)

( * ) Notice: Subject to any disclaimer, the term of this patent is extended or adjusted under 35 U.S.C. 154(b) by 431 days.

(21) Appl. No.: 11/944,286

(22) Filed: Nov. 21, 2007

(65) Prior Publication Data
US 2008/0120818 A1 May 29, 2008

Related U.S. Application Data

(60) Provisional application No. 60/867,430, filed on Nov. 28, 2006.

(51) Int. Cl.
*F16B 45/02* (2006.01)
(52) U.S. Cl. ..................... 24/599.5; 24/600.1
(58) Field of Classification Search ............... 24/598.2, 24/599.5, 600.1
See application file for complete search history.

(56) References Cited

U.S. PATENT DOCUMENTS

| 731,162 | A | * | 6/1903 | Carter | 24/600.1 |
| 1,521,811 | A | * | 1/1925 | Hartbauer | 24/600.8 |
| 5,579,564 | A | * | 12/1996 | Rullo et al. | 24/599.5 |
| 5,735,025 | A | | 4/1998 | Bailey | |
| 6,283,524 | B1 | | 9/2001 | Simond | |

* cited by examiner

*Primary Examiner* — Jack W. Lavinder
(74) *Attorney, Agent, or Firm* — Baker & Associates PLLC; Trent H. Baker

(57) ABSTRACT

One embodiment of the present invention relates to an automatically locking carabiner system including a frame, a gate, a gate biasing system, and a gate locking system. The frame and gate form a continuously enclosed inner region in a closed configuration with respect to the frame. When in an engaged state, the gate locking system is configured to automatically lock the gate in the closed configuration with respect to the frame. The gate locking system may include a trigger coupled to the frame such that the position of the trigger corresponds to the state of the gate locking system. The trigger may be positioned on an opposite side of the frame from the gate with respect to the inner region. The force required to disengage the gate locking system may be substantially opposite that which is required to transition the gate to the open configuration with respect to the frame.

13 Claims, 4 Drawing Sheets

SAFETY CARABINER

RELATED APPLICATIONS

This application claims priority to U.S. provisional application Ser. No. 60/867,430 filed Nov. 28, 2006, the contents of which are incorporated by reference.

FIELD OF THE INVENTION

The invention generally relates to mechanical coupling mechanisms such as carabiners and snap-hooks. In particular, the invention relates to an improved safety carabiner and locking system.

BACKGROUND OF THE INVENTION

Carabiners, snap-hooks, and releasable clamps are used in a variety of applications for releasably coupling objects to one another. For example, a rock climber may use one or more carabiners to releasably secure a rope to a protection device during vertical ascension. Carabiners generally include a frame, a gate, and a releasable gate closure mechanism. The gate is configured to releasably engage the frame, so as to form a continuous inner region which can be used to mechanically couple to one or more objects. The releasable gate closure mechanism is a biasing system that allows the gate to be temporarily opened to facilitate adding or removing items from the continuous inner region. The releasable gate closure mechanism also biases the gate in a closed configuration with respect to the frame, so as to maintain mechanical coupling of items within the continuous inner region.

Various specialized carabiners are designed for particular applications. One type of specialized carabiner includes an auto-locking mechanism in addition to a standard gate biasing mechanism. An auto-locking mechanism requires a user to perform an additional act to open the carabiner gate with respect to the frame. For example, auto-locking mechanisms may require a user to twist, push, or pull a mechanism prior to or while exerting an opening force on the gate in order to open the gate with respect to the frame of the carabiner. The activity of Via Ferrata is particularly suited for use of one or more specialized carabiners that include auto-locking mechanisms.

Various problems exist with conventional auto-locking carabiners, including reliability, profile, performance, etc. Many auto-locking mechanisms do not reliably lock and/or release and thus compromise the safety of a user. Likewise, the profile or dimensions of many conventional auto-locking carabiners impede a user's ability to operate the mechanism, which may lead to unintended release or inability to release at critical moments. And further, the overall performance and operation of an auto-locking mechanism has a significant affect on the safety and ability of a user during activities that require the use of the mechanism.

Therefore, there is a need in the industry for a carabiner and auto-locking mechanism that overcomes the limitations of existing systems in a cost efficient manner.

SUMMARY OF THE INVENTION

The present invention relates to an improved safety carabiner and locking system. One embodiment of the present invention relates to an automatically locking carabiner system including a frame, a gate, a gate biasing system, and a gate locking system. The frame and gate form an inner region which is continuously enclosed when the gate is in a closed configuration with respect to the frame. The gate biasing system biases the gate toward the closed configuration with respect to the frame. When in an engaged state, the gate locking system is configured to automatically lock the gate in the closed configuration with respect to the frame. The gate locking system may include a trigger coupled to the frame such that the position of the trigger corresponds to the state of the gate locking system. The trigger may be positioned on an opposite side of the frame from the gate with respect to the inner region. A pivot point between the trigger and frame may be positioned further from the inner region than a pivot point between the gate and the frame. The force required to disengage the gate locking system may be substantially opposite that which is required to transition the gate to the open configuration with respect to the frame. A second embodiment of the present invention relates to a method for disengaging an automatic gate locking system and opening a carabiner gate on an automatically locking carabiner system. When two substantially oppositely oriented forces are exerted on the gate and trigger respectively, an automatic locking system is disengaged and the gate pivots with respect to the frame to an open configuration.

Embodiments of the present invention represent a significant advance in the field over conventional locking carabiners. Configuring the trigger to disengage a gate locking system in response to a force opposite to that which opens the gate allows for efficient and reliable one handed operation. Likewise, positioning the trigger on an opposite lengthwise side of the frame enables a user to clamp the frame so as to cause opening of the gate with respect to the frame. This efficient and ergonomic operation ensures reliability in dangerous activities without requiring cumbersome manipulation or multi-handed operation.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. The Figures presented in conjunction with this description are views of only particular—rather than complete—portions of the systems and methods of making and using the system according to the invention. In the Figures, the physical dimensions may be exaggerated for clarity.

DETAILED DESCRIPTION OF THE INVENTION

Figure 1:
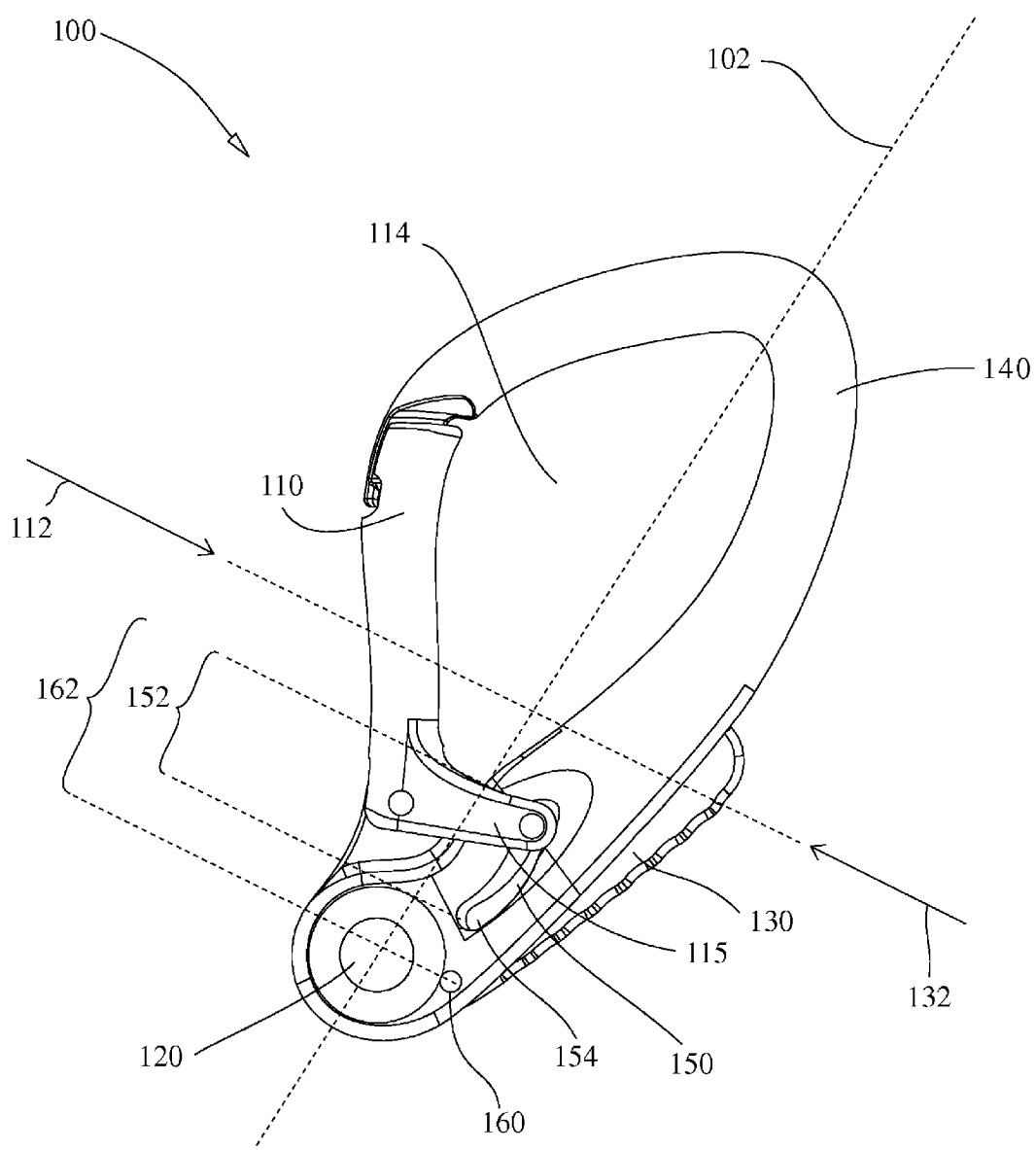
FIG. 1 illustrates a profile assembled view of an automatically locking carabiner system with a gate in an closed configuration and with a gate locking system in an engaged state in accordance with one embodiment of the present invention.

The present invention relates to an improved safety carabiner and locking system. One embodiment of the present invention relates to an automatically locking carabiner system including a frame, a gate, a gate biasing system, and a gate locking system. The frame and gate form an inner region which is continuously enclosed when the gate is in a closed configuration with respect to the frame. The gate biasing system biases the gate toward the closed configuration with respect to the frame. When in an engaged state, the gate locking system is configured to automatically lock the gate in the closed configuration with respect to the frame. The gate locking system may include a trigger coupled to the frame such that the position of the trigger corresponds to the state of the gate locking system. The trigger may be positioned on an opposite side of the frame from the gate with respect to the inner region. A pivot point between the trigger and frame may be positioned further from the inner region than a pivot point between the gate and the frame. The force required to disengage the gate locking system may be substantially opposite that which is required to transition the gate to the open configuration with respect to the frame. A second embodiment of the present invention relates to a method for disengaging an automatic gate locking system and opening a carabiner gate on an automatically locking carabiner system. When two substantially oppositely oriented forces are exerted on the gate and trigger respectively, an automatic locking system is disengaged and the gate pivots with respect to the frame to an open configuration. While embodiments of present invention are described in reference to a safety carabiner system, it will be appreciated that the teachings of present invention are applicable to other areas.

The following terms are defined as follows:

Biasing—defaulting or urging a component toward a particular configuration. For example, a rubber band is biased toward a particular circumference; this means that if it is stretched and released, it will return to the biased circumference. A second example may include a public restroom door being biased toward a closed configuration; it may be opened, but upon release it automatically returns to the closed configuration. A third example may include an elevator being biased towards the first floor of a building; the elevator may be engaged to transfer to a particular floor, but upon completion it will automatically return to the first floor.

Carabiner—a mechanical device including a frame, a gate, and an inner region defined between the frame and gate. The gate is biased toward a closed configuration in which the inner region is continuous with regards to being enclosed by the frame and gate. In response to a particular force, the gate is configured to pivot with respect to the frame to create an opening of the inner region, thereby forming an open configuration.

Gate biasing system—a system of components configured to bias the gate of a carabiner toward a particular configuration.

Gate locking system—a system of components configured to lock or fix the gate of a carabiner in a closed configuration with respect to the frame. The system may include an engaged/locked state and a disengaged/released state. A gate locking system is selectively releasable in response to a particular force so as to disengage/release the gate locking system to enable the gate to function normally. The force required to disengage or engage the gate locking system is generally independent of that which is required to pivot the gate of a carabiner. A gate locking system may be biased towards an engaged or disengaged state.

Lengthwise—an orientation for measurement referring to the longest dimension of a mechanical component.

Reference is made to FIG. 1, which illustrates a profile assembled view of an automatically locking carabiner system, designated generally at 100. The system 100 primarily includes a frame 140, a gate 110, an inner region 114, a gate biasing system, and a gate locking system. A lengthwise axis 102 is provided for reference and relative component measurement purposes. It will be appreciated that the term lengthwise is used in substantially in reference to the illustrated axis in relation to the system 100 despite dramatic shape or design modifications which may be made and remain consistent with the present invention. FIG. 1 illustrates the gate 110 and frame 140 in a closed configuration such that the inner region 114 is continuously enclosed between the gate 110 and frame 140. The gate biasing system (not designated) biases the gate 110 toward the closed configuration with respect to the frame 140. Various well known gate biasing systems may be used, including but not limited to those composed of springs, compliant materials, etc. The frame 140 forms the supportive structure of the system 100 and is shaped in a substantially concave manner with the respect to the gate 110. The exact curvature, shape, and composition of the frame 140 may be adjusted to modulate various other carabiner related performance aspects without affecting the teachings of the present invention. Frame 140 further includes a gate pivot recess 150, a second inner region 120, and a trigger pivot 160. The gate pivot recess 150 is a slotted region providing a channel through which a portion of the gate 110 may translate to effectuate the operation of the gate 110 with respect to the system 100. This illustrated gate pivot recess 150 is three dimensionally curved to facilitate smooth mechanical operation between the gate 110 and the frame 140. The second inner region 120 is a fixably continuous recess extending orthogonally through the frame 140, as shown. The trigger pivot 160 is a pivot point between the frame and trigger 130 such as a rotational pin type coupling.

The gate 110 is pivotably coupled to the frame 140, thereby forming the inner region 114. As discussed above, the inner region is continuously enclosed when the gate 110 is in the illustrated closed configuration. The gate 110 is coupled to a pivot arm 115 facilitating the pivotable coupling. The pivot art 115 orthogonally couples the gate 110 to an opposite lengthwise side of the frame 140 to facilitate the pivotable movement between the gate 110 and frame 140. In particular, the pivot arm 115 translates through the gate pivot recess 150 of the frame 140. The orientation of the pivot arm 115 and the relative frame 140 positioning of the gate pivot recess 150 causes the effective pivot point 154 of the gate 110 with respect to the frame 140 to be disposed on an opposite lengthwise side of the frame 140 from the gate 110. The effective gate pivot point 154 is disposed at a particular lengthwise distance 152 from the inner region 114, as illustrated.

With continued reference to FIG. 1, the gate locking system is illustrated in an engaged state, thereby fixing the gate 110 with respect to the frame 140. The gate locking system further includes a trigger 130 pivotably coupled to the frame 140 at the trigger pivot 160, as illustrated. The trigger pivot 160 is a particular second lengthwise distance 162 from the inner region 114. It will be noted that the particular lengthwise distance 152 (gate pivot point distance) is shorter than the second particular lengthwise distance 162 (trigger pivot point distance). In addition, the second lengthwise distance 162 (trigger pivot point distance) is further from the inner region 114 than a portion of the second inner region 120. The trigger 130 is internally pivotably coupled to the frame 140 meaning that the pivotable coupling is disposed internally within the frame. In addition, the trigger 130 is configured to pivot within the frame 140 when depressed. The trigger further includes a trigger pivot recess 131. Further description of the trigger 130 and the pivotable coupling to the frame 140 will be provided with reference to FIGS. 2-4.

Figure 3:
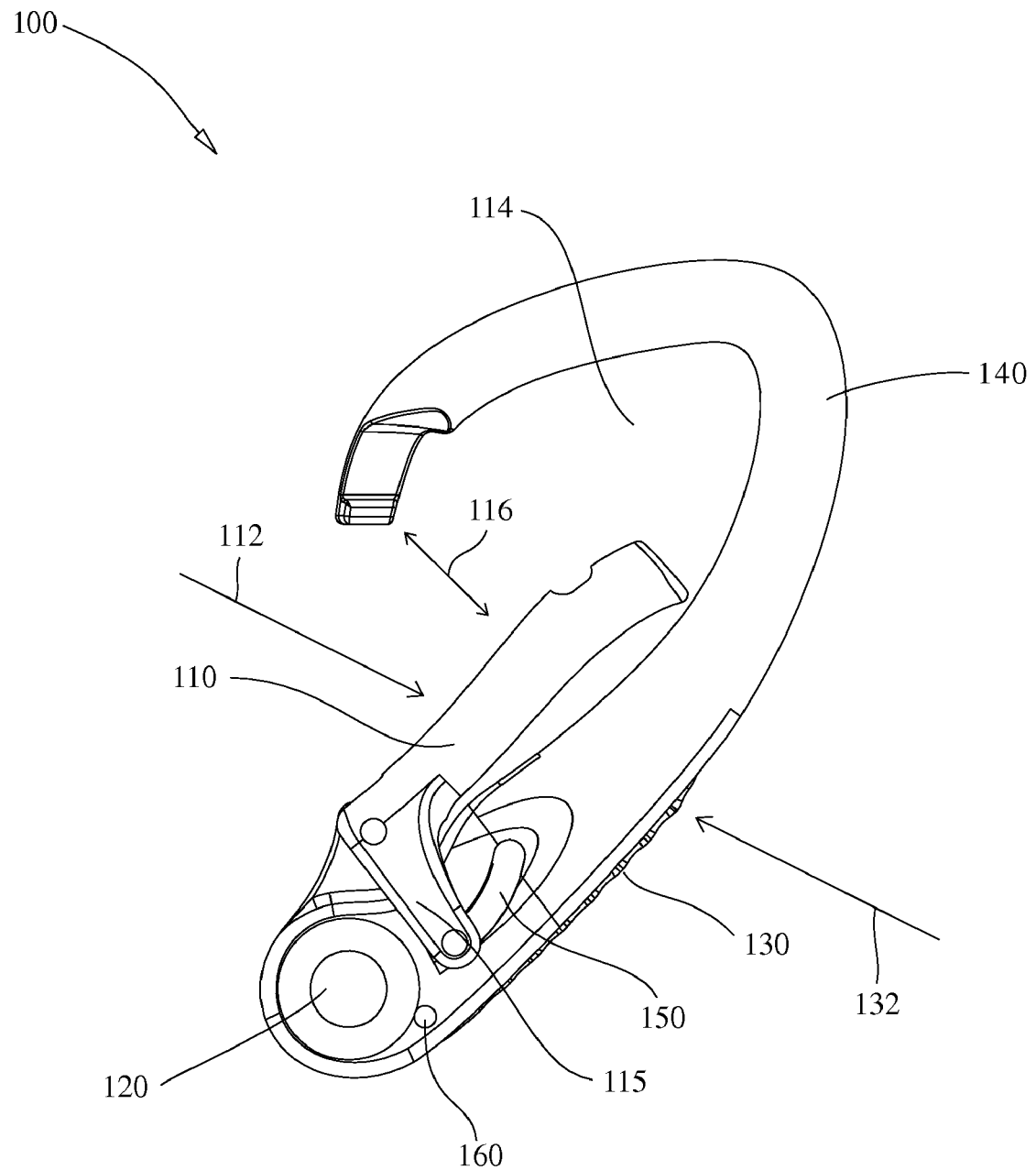
FIG. 3 illustrates a profile assembled view of an automatically locking carabiner system with a gate in an open configuration and with a gate locking system in a disengaged state in accordance with one embodiment of the present invention.

In operation, the gate 110 is pivotably coupled to the frame 140 about the gate pivot recess 150 and the effective pivot point 154. The effective pivot point 154 is a point corresponding to the lowest portion of the gate pivot recess 150 at which the gate 110 pivots 110 inward toward the inner region 114 (as seen in FIG. 3). The gate biasing system biases the gate into the illustrated closed configuration with respect to the frame. The gate biasing system may be overcome to pivot the gate 110 toward the inner region 114 by applying a first force 112. However, in the illustrated biased engaged state of the gate locking system, the gate is locked/fixed in the closed configuration regardless of the application of the first force 112. The gate locking system may be disengaged by applying a second force 132, causing the trigger 130 to pivot toward the inner region 114. Therefore, the gate 110 may be opened (overcoming the gate biasing system and disengaging the gate locking system) by simultaneously applying the first and second forces 112, 132 to the gate 110 and trigger 130 respectively. It will be appreciated that the first and second forces 112, 132 may be oriented at slightly different orientations while maintaining the same functionality. It is also important to note that the first and second forces 112, 132 are substantially opposite one another facilitating an ergonomic and efficient means for simultaneously disengaging the gate locking system and overcoming the gate biasing system. This orientation of opposing forces is particularly well suited for intentional and reliable operation by a human hand. A dotted line between first and second forces 112, 132 illustrates the substantially opposite three dimensional orientation. It will be appreciated that based on well characterized vector analysis, various alternatively oriented forces may be composed of component forces oriented in substantially the same three dimensional orientations shown.

Figure 2:
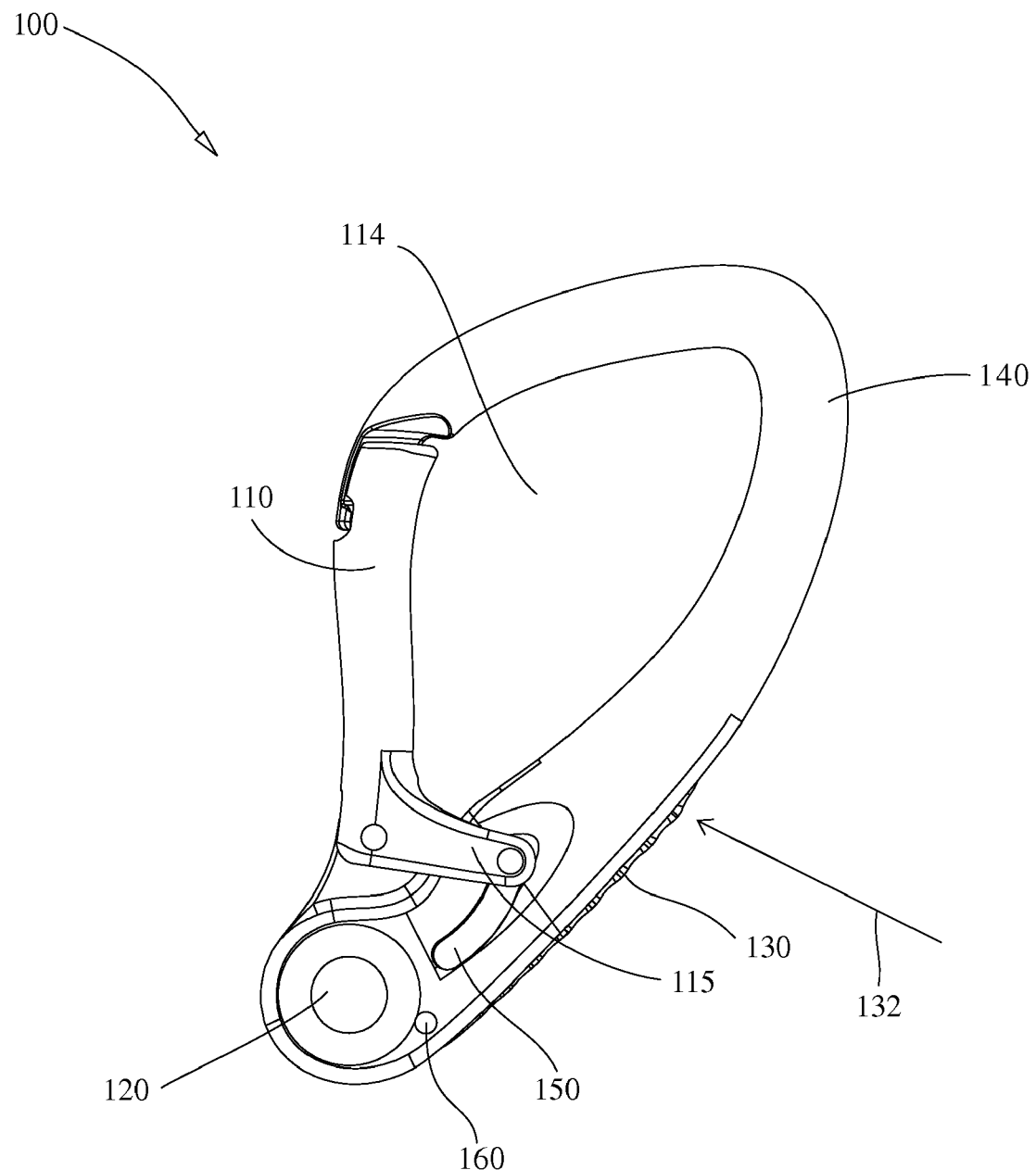
FIG. 2 illustrates a profile assembled view of an automatically locking carabiner system with a gate in an closed configuration and with a gate locking system in a disengaged state in accordance with one embodiment of the present invention.

Reference is next made to FIG. 2, which illustrates the system 100 with the gate 110 in a closed configuration and with the trigger 130 of the gate locking system in a disengaged state. As discussed above, the gate locking system includes the trigger 130 which is pivotably internally coupled to the frame 140. The relatively pivotable positioning of the trigger 130 with respect to the frame 140 corresponds to the state of the gate locking system. In FIG. 1, the trigger 130 was pivoted away from the inner region 114 and frame 140 a particular amount corresponding to the biased engaged state of the gate locking system. In the present figure, the trigger 130 is pivoted so as to be substantially internally disposed within the frame 140. It may be stated that the trigger 130 is substantially disposed within the three dimensional profile or outline of the frame 140. The operational pivoting of the trigger 130 with respect to the frame is in response to the second force 132. In operation, the second force 132 is applied upon the trigger 130 causing it to pivot about the trigger pivot point 160 toward the inner region 114 and substantially within the frame 140. The described pivoting causes the trigger pivot recess 131 (see FIG. 4) to substantially align with the gate pivot recess 150, allowing the gate 110 to be pivoted with respect to the frame 140. However, the gate biasing system causes the gate 110 to remain in the closed configuration unless the first force 112 is applied.

Reference is next made to FIG. 3, which illustrates the system 100 with the gate 110 in an open configuration and with the trigger 130 of the gate locking system in a disengaged state. The gate 110 is pivoted within the inner region 114 thereby forming an opening 116 in the inner region 114. To cause the illustrated configuration of the system 100, both the first and second forces 112, 132 must be applied to the gate 110 and trigger 130 respectively. In the illustrated open configuration, the gate 110 is pivoted toward the opposite lengthwise side of the frame 140 across the inner region 114. This relative pivoting of the gate 110 corresponds to the rotation and/or translation of the pivot arm 115 within the gate pivot recess 150. As described above, the pivot arm 115 is able to translate through the gate pivot recess 150 because it is aligned with the trigger pivot recess 131, forming a consistent opening through the frame to facilitate the necessary pivot arm 115 movement.

Figure 4:
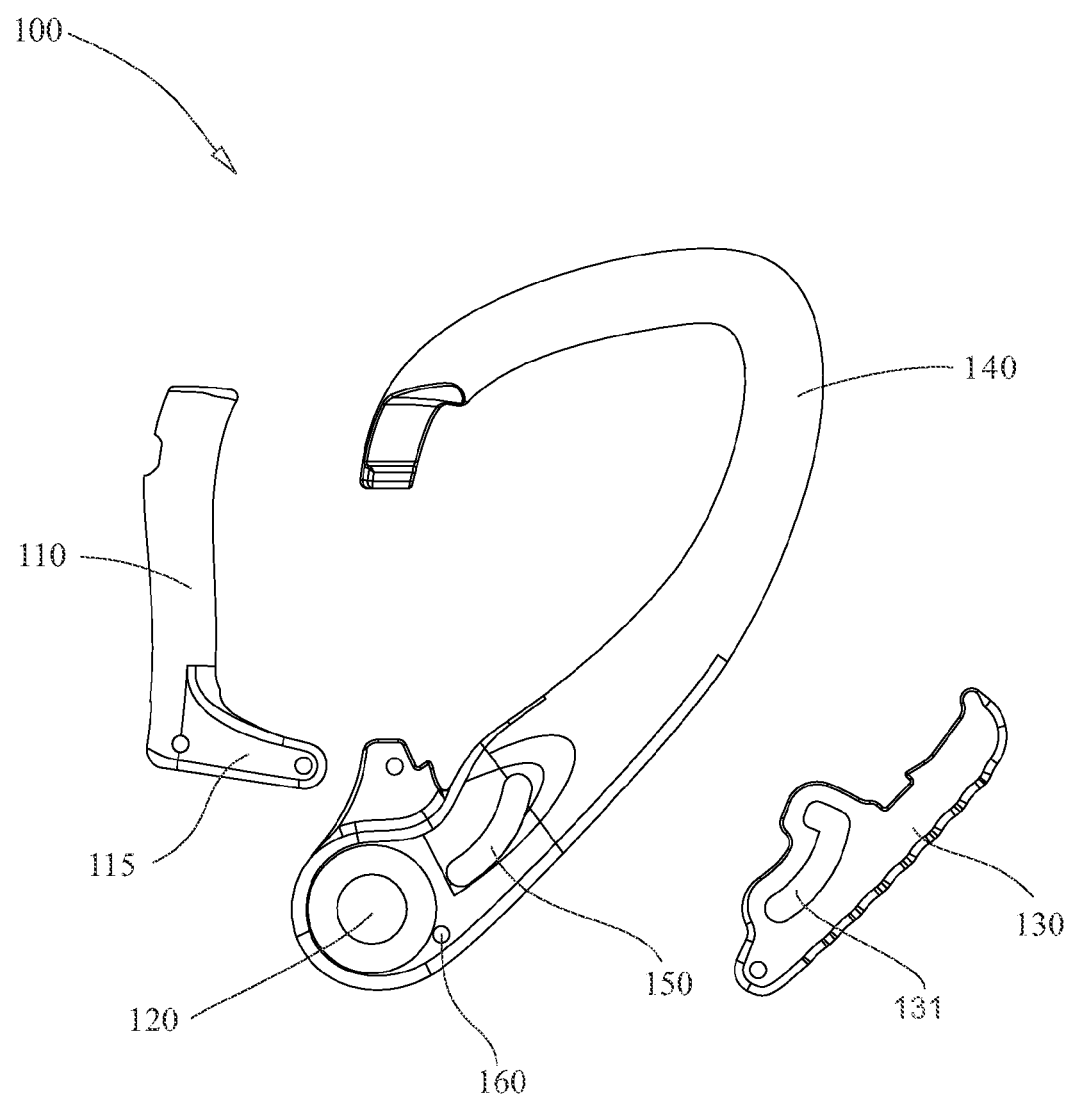
FIG. 4 illustrates a profile exploded view of the safety carabiner system embodiment illustrated in FIGS. 1-3.

Reference is next made to FIG. 4, which illustrates a profile exploded view of the components of the system 100 illustrated in FIGS. 1-3. In particular, the trigger pivot recess 131 is visible. As discussed above, the operation of the gate locking system requires that the trigger pivot recess 131 be aligned with the gate pivot recess 150 to disengage the gate locking system and allow the gate 110 to be pivoted with respect to the frame 140. Various other geometries are also visible in the illustrated exploded view.

The relatively positioning of the various components, including the effective gate pivot point 154 and the trigger pivot point 160, significantly enables the system 100 to undergo efficient and reliable transitions between respective states and configurations. Likewise, the thickness of the frame 140, positioning of the second inner region 120, component shapes, etc. also significantly affect the performance of the illustrated system 100.

It should be noted that various other safety carabiner systems may be practiced in accordance with the present invention, including one or more portions or concepts of the embodiment illustrated in FIGS. 1-4. For example, a system may be practiced without a second inner region, with an alternative frame shape, etc.

Various other embodiments have been contemplated, including combinations in whole or in part of the embodiments described above.

What is claimed is:

1. An automatically locking carabiner system comprising:
   a frame;
   a gate pivotably coupled to the frame, wherein in a closed configuration the gate and frame form a continuously enclosed inner region, and wherein in an open configuration the gate is pivotably rotated within the inner region to form an opening;
   a gate biasing system coupled to the frame and gate, biasing the gate toward the closed configuration with respect to the frame, and wherein the gate biasing system is independent of the trigger; and
   a gate locking system coupled to the frame and gate, wherein the gate locking system includes an engaged state and a disengaged state, and wherein the engaged state corresponds to gate and frame being locked in the closed configuration, and wherein the disengaged state corresponds to the gate being pivotably rotatable with respect to frame, and wherein the gate locking system is biased toward the engaged state, and wherein the gate locking system further includes a trigger pivotably coupled to the frame and disposed on an opposite lengthwise side of the frame from the gate with respect to the inner region, and wherein the pivotably coupled trigger is internally pivotably coupled to the frame so as to be substantially disposed within a portion of the frame in the disengaged state.

2. The carabiner of claim 1, wherein the frame further includes a second continuously enclosed inner region fixed in a continuously enclosed configuration, wherein the second continuously enclosed inner region is independent of the inner region.

3. The carabiner of claim 2, wherein the pivot point between the trigger and the frame is disposed at a lengthwise location further from the inner region than a portion of the second continuously enclosed inner region.

4. The carabiner of claim 2, wherein the pivot point between the trigger and the frame is disposed on an opposite lengthwise side of the frame from the gate.

5. The carabiner of claim 1, wherein the gate locking system is configured to be transitioned from the biased engaged state to the disengaged state by applying a second force upon the trigger oriented substantially opposite to a first force configured to pivot the gate with respect to the frame into the open configuration.

6. The carabiner of claim 1, wherein the pivot point between the trigger and the frame is disposed at a lengthwise location further from the inner region than the pivot point between the gate and the frame.

7. The carabiner of claim 1, wherein the gate locking system is disposed entirely within the linear dimensions of the frame in a particular plane.

8. The carabiner of claim 1, wherein the gate further includes a substantially perpendicular pivot arm, and wherein the gate pivots about a lengthwise end of the pivot arm with respect to the frame.

9. An automatically locking carabiner system comprising:
a frame;
a gate pivotably coupled to the frame, wherein in a closed configuration the gate and frame form a continuously enclosed inner region, and wherein in an open configuration the gate is pivotably rotated within the inner region to form an opening;
a gate biasing system coupled to the frame and gate, biasing the gate toward the closed configuration with respect to the frame; and
a gate locking system coupled to the frame and gate, wherein the gate locking system includes an engaged state and a disengaged state, and wherein the engaged state corresponds to gate and frame being locked in the closed configuration, and wherein the disengaged state corresponds to the gate being pivotably rotatable with respect to frame, and wherein the gate locking system is biased toward the engaged state, and wherein the gate locking system further includes a trigger pivotably coupled to the frame and disposed on an opposite lengthwise side of the frame from the gate with respect to the inner region, and wherein the pivotably coupled trigger is internally pivotably coupled to the frame so as to be substantially disposed within a portion of the frame in the disengaged state;
wherein the frame further includes a gate pivot recess, and wherein the trigger further includes a trigger pivot recess, and wherein the disengaged state corresponds to the gate pivot recess being substantially aligned with the trigger pivot recess.

10. A method for efficiently and safely disengaging an automatic gate locking system and opening a carabiner gate on an automatically-locking carabiner system, comprising the acts of:
providing an automatically-locking carabiner comprising a gate, a frame, an inner region defined between the gate and frame, and a trigger;
biasing the gate toward a closed configuration with respect to the frame, independent of the trigger;
locking the gate in the closed configuration with respect to the frame;
applying a first force to the gate, wherein the first force is oriented substantially perpendicular to the gate and toward the inner region;
applying a second force to the trigger, wherein the second force is oriented substantially perpendicular to the trigger and toward the inner region;
in response to the second force, internally pivoting the trigger within the frame about a pivot point lengthwise disposed further from the inner region than a pivot point of the gate with respect to the frame; and
if the first force and second force are applied simultaneously, pivoting the gate within the inner region with respect to the frame.

11. The method of claim 10, wherein the act of providing an automatically locking carabiner includes providing an automatically-locking carabiner comprising:
a frame;
a gate pivotably coupled to the frame, wherein in a closed configuration the gate and frame form a continuously enclosed inner region, and wherein in an open configuration the gate is pivotably rotated within the inner region to form an opening;
a gate biasing system coupled to the frame and gate biasing the gate toward the closed configuration with respect to the frame; and
a gate locking system coupled to the frame and gate, wherein the gate locking system includes an engaged state and a disengaged state, and wherein the engaged state corresponds to gate and frame being locked in the closed configuration, and wherein the disengaged state corresponds to the gate being pivotably rotatable with respect to frame, and wherein the gate locking system is biased towards the engaged state, and wherein the gate locking system further includes a trigger pivotably coupled to the frame and disposed on an opposite lengthwise side of the frame from the gate with respect to the inner region, and wherein the pivotably coupled trigger is internally pivotably coupled to the frame so as to be substantially disposed within a portion of the frame in the disengaged state.

12. The method of claim 10, wherein the act of pivoting the gate within the inner region with respect to the frame further includes aligning a trigger recess with a gate recess to enable the gate to pivot with respect to the frame.

13. The method of claim 10, wherein the act of internally pivoting the trigger within the frame further includes pivoting the trigger about a location lengthwise below the gate pivot location.

* * * * *